United States Patent [19]
Petit et al.

[11] Patent Number: 5,927,030
[45] Date of Patent: Jul. 27, 1999

[54] CAVITY FLOOR PANEL WITH REMOVABLE FUNCTIONAL ELEMENTS FOR AREAS OF FALSE FLOORING

[75] Inventors: Yves Petit, le Vesinet; Yves Georget, Meudon la Foret, both of France

[73] Assignee: Juy SA, France

[21] Appl. No.: 08/954,369

[22] Filed: Oct. 20, 1997

[30] Foreign Application Priority Data

Jul. 31, 1997 [EP] European Pat. Off. ............. 97401784

[51] Int. Cl.$^6$ .................. E04B 5/00; E04C 2/38
[52] U.S. Cl. ......................... 52/220.1; 52/656.1
[58] Field of Search ................. 52/656.9, 220.1, 52/474, 475.1, 479, 480, 483.1, 263, 656.1, 220.5, 220.6, 126.2, 126.5, 656.8; 403/13, 4

[56] References Cited

U.S. PATENT DOCUMENTS

| | | | |
|---|---|---|---|
| 3,003,600 | 4/1961 | MacKenzie | 403/4 |
| 5,477,649 | 12/1995 | Bessert | 52/220.1 |
| 5,791,096 | 8/1998 | Chen | 52/263 |

FOREIGN PATENT DOCUMENTS 0 621 451 A2  10/1994  European Pat. Off. .

*Primary Examiner*—Carl D. Friedman
*Assistant Examiner*—Dennis L. Dorsey
*Attorney, Agent, or Firm*—Jones & Askew

[57] ABSTRACT

Prefabricated functional elements that can be made to suit all cavity-type false floors, intended to allow the running of cables and any other ducting for fluids without having to cut whole floor panels. The cavity floor panels are made up of removable and demountable functional elements positioned inside or outside a frame itself having the dimensions of a multiple or a sub-multiple of the neighboring false-flooring panels and supported by crossmembers whose spacing is variable. The functional elements inside or outside the frame can be removed individually, all at once, or in any combination, and are interchangeable.

6 Claims, 5 Drawing Sheets

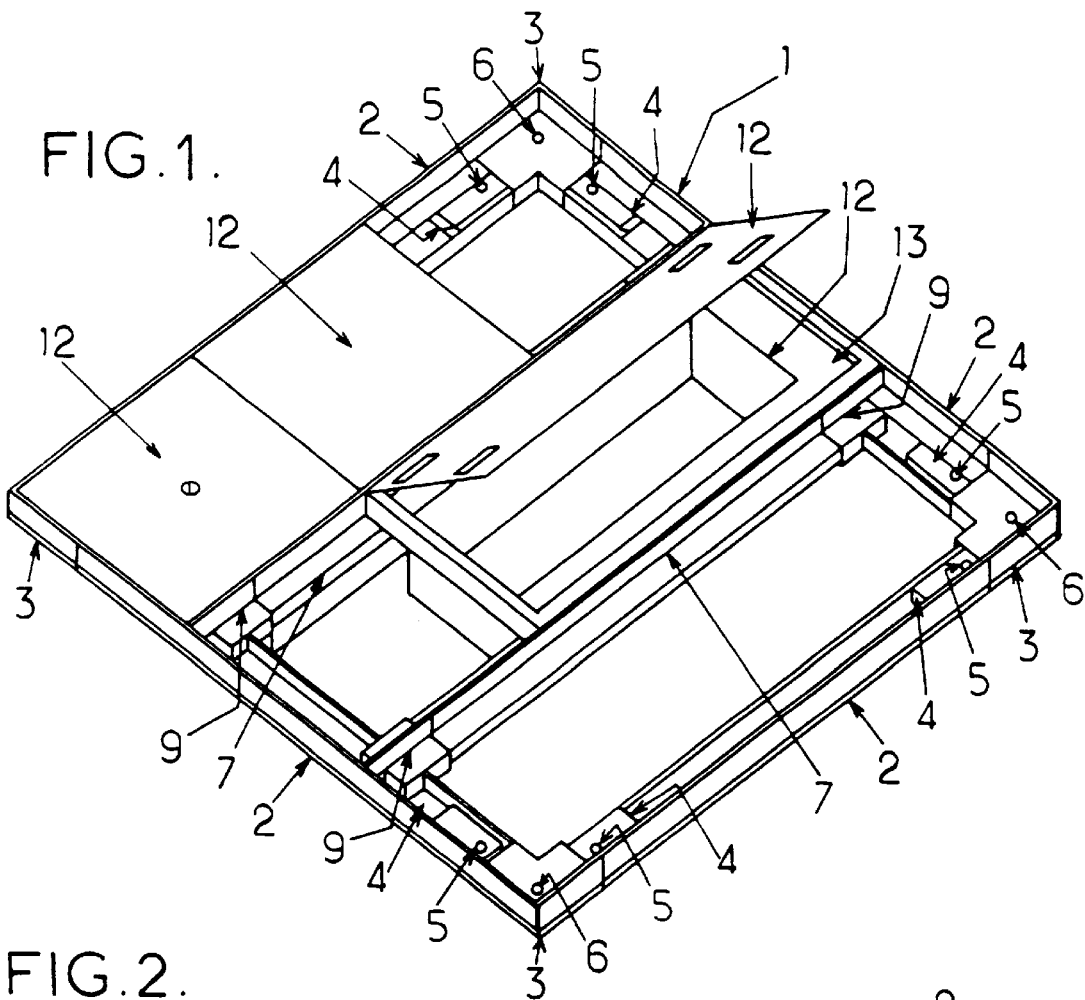
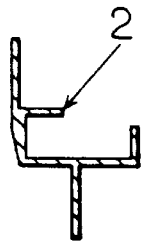
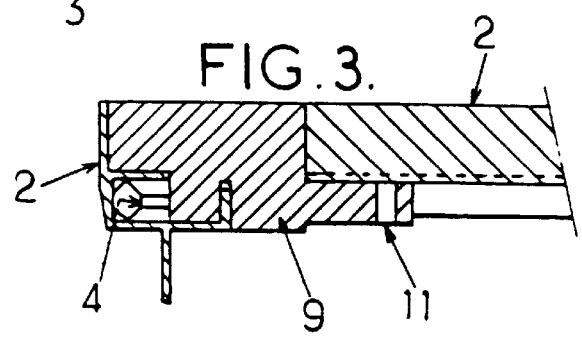
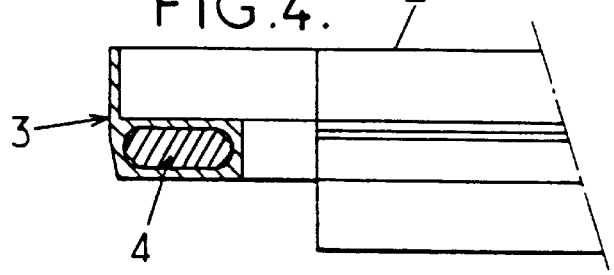

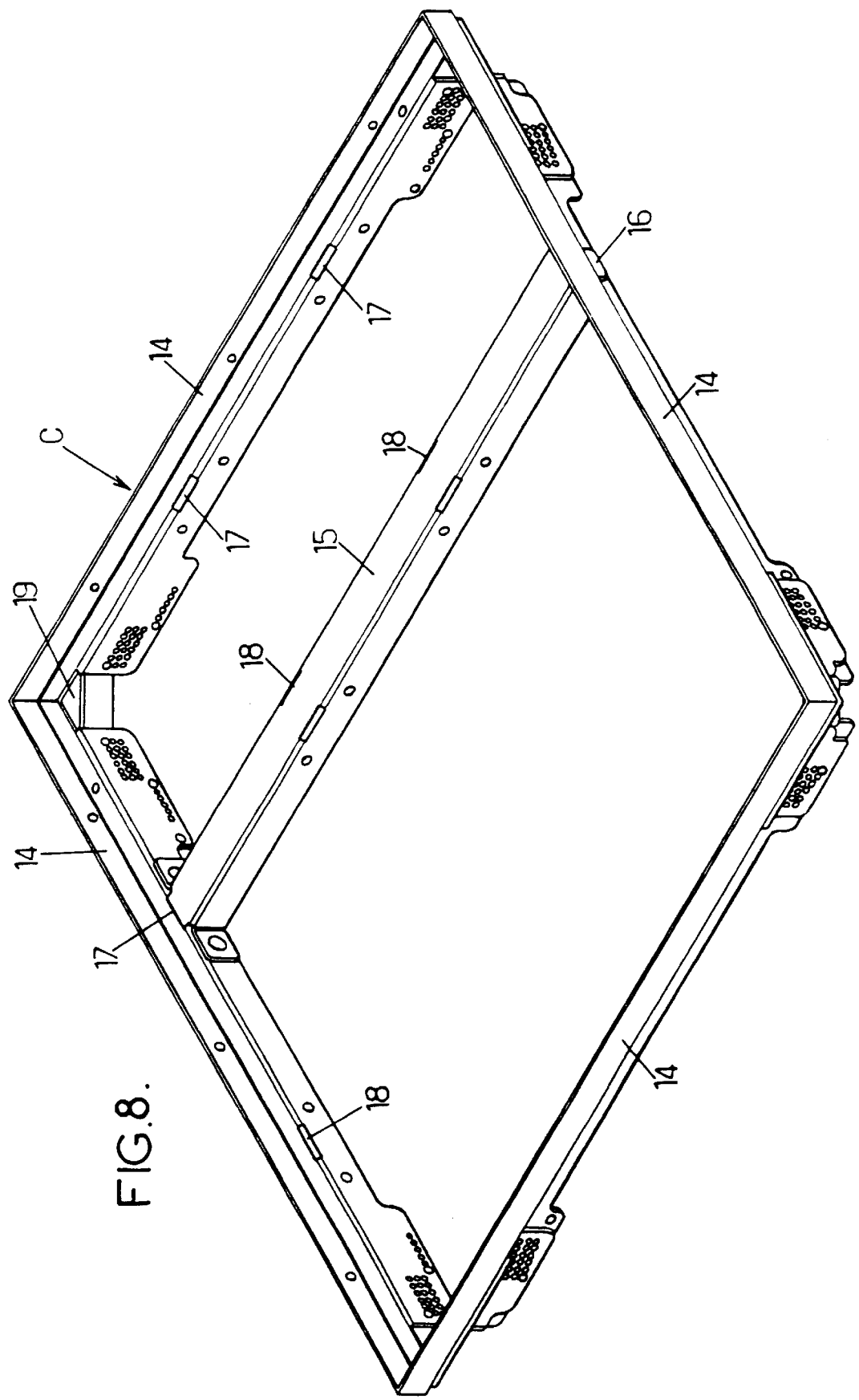

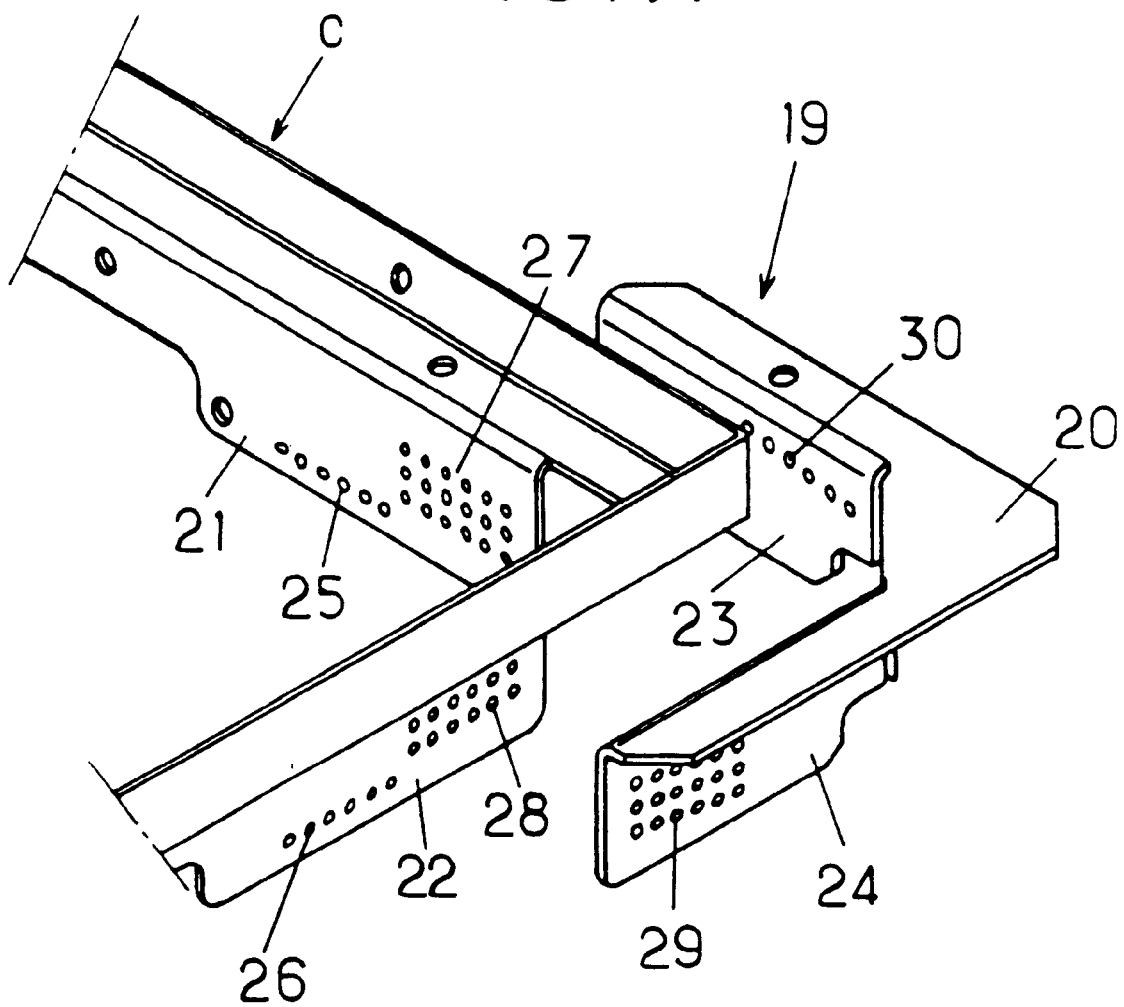

CAVITY FLOOR PANEL WITH REMOVABLE FUNCTIONAL ELEMENTS FOR AREAS OF FALSE FLOORING

The present invention relates to the manufacture of a floor panel made up of basic elements and accessories, intended to complete areas of cavity flooring.

This floor panel comprises easily removable short functional elements which in the main make it easier for cables, pipes or the like, running beneath the false floor to pass through the surface defined by the level of the false floor, and removable support frames.

The floor panel that is the subject matter of the invention is designed to be used in all rooms that have a false floor, being adaptable to suit all types of current models of floor panel for false floors.

The floor panel has the technical, economic and ecological advantages described below.

Ever since raised cavity floors known as "false floors" were first introduced, the problem of ease with which the flatness of the entire surface could be adjusted, and of running cables, pipes or the like through the elements that made up these floor panels for false floors has never yet been solved satisfactorily, either from the technical or from the economic standpoint. Each floor panel rests on four jacks which have to be adjusted very accurately even though a plane is defined by its passage through three points.

Technically, the known solution consists in cutting full-sized floor panels to suit, either at the center or along an edge.

This has the following drawbacks:

Work with a powered saw that has to be done outside of sensitive rooms (sawing chips and metal blast), generally carried out by an out-of-house joiner who has to move around from job to job and is not often immediately available.

These cuts weaken the floor panels which are designed as a stand-alone assembly, which means that it is impossible to make large holes.

It is technically impossible to make cuts at the corners or near the corners of the floor slabs because of the space needed for it to rest on the support jacks.

Economically, the fact of having to call in a tradesman and his tools to carry out this cutting work represents a high cost. There is rarely anyone in-house who is skilled and/or who agrees to use the necessary tools, if there actually is any, because of the risk of injury.

In general, a holed floor panel is scrapped when it is no longer in use, something which happens often, especially in computer rooms where the type and layout of the machines are often changed.

As no one has the heart to throw them away, because they represent a cost to buy new, they are stored somewhere, which ties up floor space, in the hope of being able to make further use of them some day, and this means that time is wasted looking for an already-cut floor panel that could be used again. As it is very rare that this is actually possible, another whole floor panel, which will soon join the growing heap, is cut. Eventually, the whole lot are generally removed by a clearance company, which proves expensive.

The problem is that cut old floor panels for false flooring are good for practically nothing. They cannot be reused because they are dangerous (holes, overhangs), cannot and should not burn readily because of their hybrid particleboard/adhesive/plastic/metal composition, and give off toxic and chemically harmful fumes (chlorine).

On a smaller scale, there is also an ecological problem, because nothing is readily recyclable in an old floor panel from false flooring.

To solve these problems, the invention is defined as a cavity floor panel with removable functional elements for areas of false flooring, intended to form a constituent part of a self-stabilized and rigid assembly, characterized in that it is formed of a frame of adjustable dimensions and which has on the one hand, metal section pieces of an appropriate length fitting into corner pieces by means of sliding fishplates, the total length of the elements and corner pieces corresponding to the shortest horizontal dimension of the surrounding floor panels of the false flooring, and, on the other hand, at least one metal crossmember intended to delimit spaces within the said frame, whose height also corresponds to the smallest thickness of the surrounding floor panels of the false flooring.

Give or take a few millimeters, for the same modulus, the floor panels for false flooring could all have the same dimensions both in terms of area and in terms of thickness.

The body of the floor panels may generally consist of a piece of high-density wood particleboard bonded to a metal base. Depending on the type of floor panel, this metal base may form a tray, which stiffens the edges and gives better conduction of electricity.

The upper face intended to be walked on will generally consist of a high-strength laminate, also bonded on, but may be of a different kind depending on the use to be made of the room and/or the desired decorative effect (rubber, carpeting, etc), provided this is not incompatible with the usage (generation of dust, formation/non-conductance of static electricity, among other things).

Around the upper edge, the floor panels may, generally speaking, have a clinched-on hard neoprene strip intended to make a perfect seal while having a decorative appearance.

In profile, the edges of the floor panels will advantageously be slightly trapezoidal, so that they can be fitted and removed easily, and so that they will wedge on the studs at the tops of the jacks.

Some kinds of floor panel may be made of aluminum and others may be made of shaped steel or other materials, and they may have characteristics of resistance to punching, to bending and to the flow of electrostatic charge, etc., which vary as a function of the usage.

Electrostatic charge is preferably removed via the metal support jacks which are joined together by a network of cables connected to the ground bonding line.

It should be noted that the description above is that of floor panels for false flooring in computer rooms as these represent the most severe requirements with regard to weight, to electrostatic charge, and with regard to the accuracy with which the jacks must be adjusted.

False flooring of the "office" type may have a more lightweight structure, placed on jacks, often made of plastic, which may or may not be adjustable, because they do not have the same technical requirements. In general, they can be covered with removable carpeting.

Embodiments of the invention will now be described by way of non-limiting examples with reference to the figures of the appended drawing in which:

FIG. 1 is an overall view of the system in perspective;

FIG. 2 is a view in cross-section of a metal section piece, on A—A of FIG. 7;

FIG. 3 is a sectional part view on B—B of FIG. 7;

FIG. 4 is a sectional part view on C—C of FIG. 7;

FIG. 8 depicts in perspective an alternative form of frame for a cavity floor panel in accordance with the invention; and FIG. 9 is a perspective part view showing details of the height adjustment means.

Figure 5:
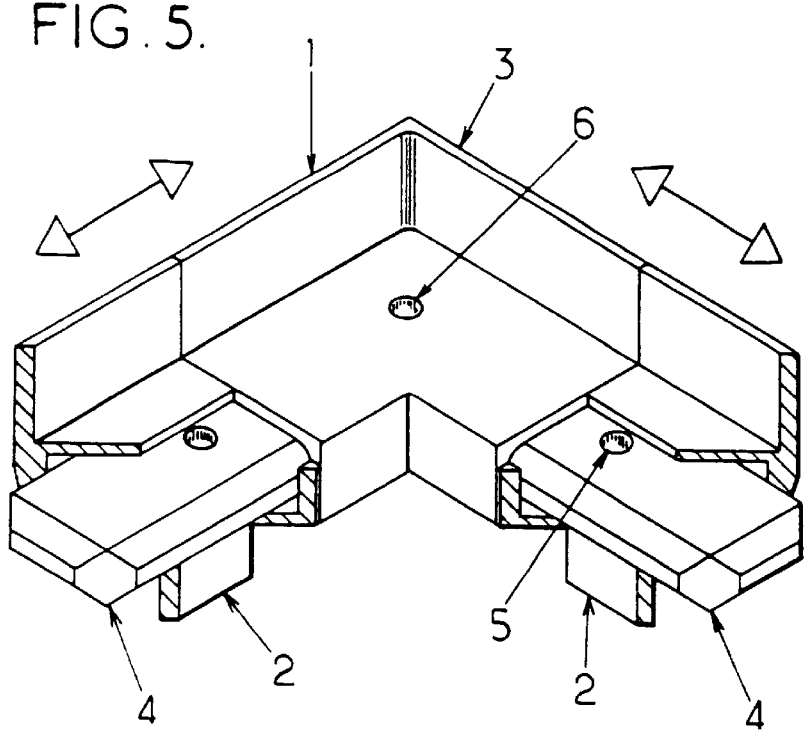
FIG. 5 is a part view in perspective showing a corner of the frame.
Figure 6:
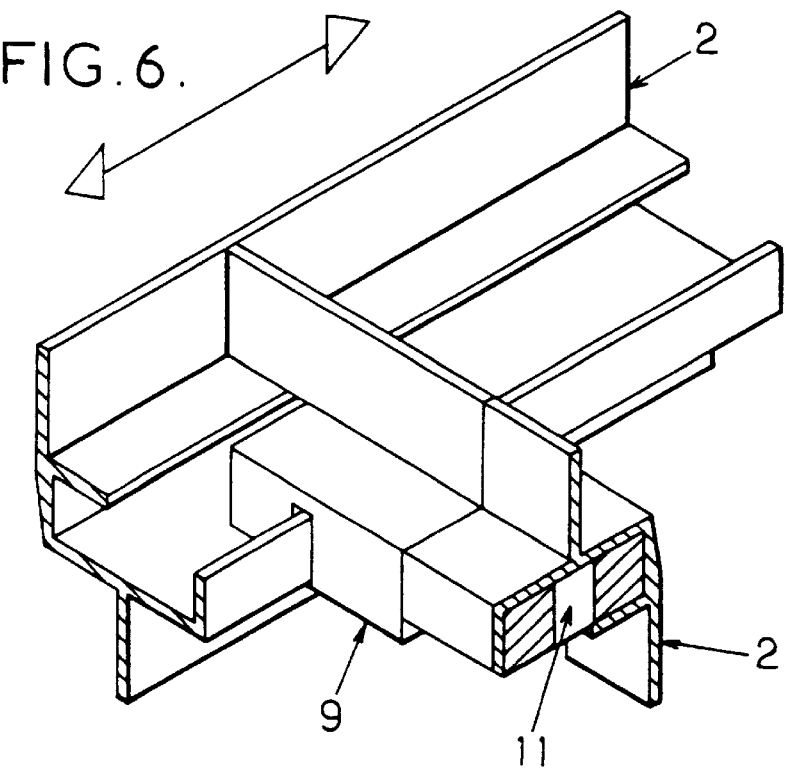
FIG. 6 is a part view in perspective showing the head of a crossmember.
Figure 7:
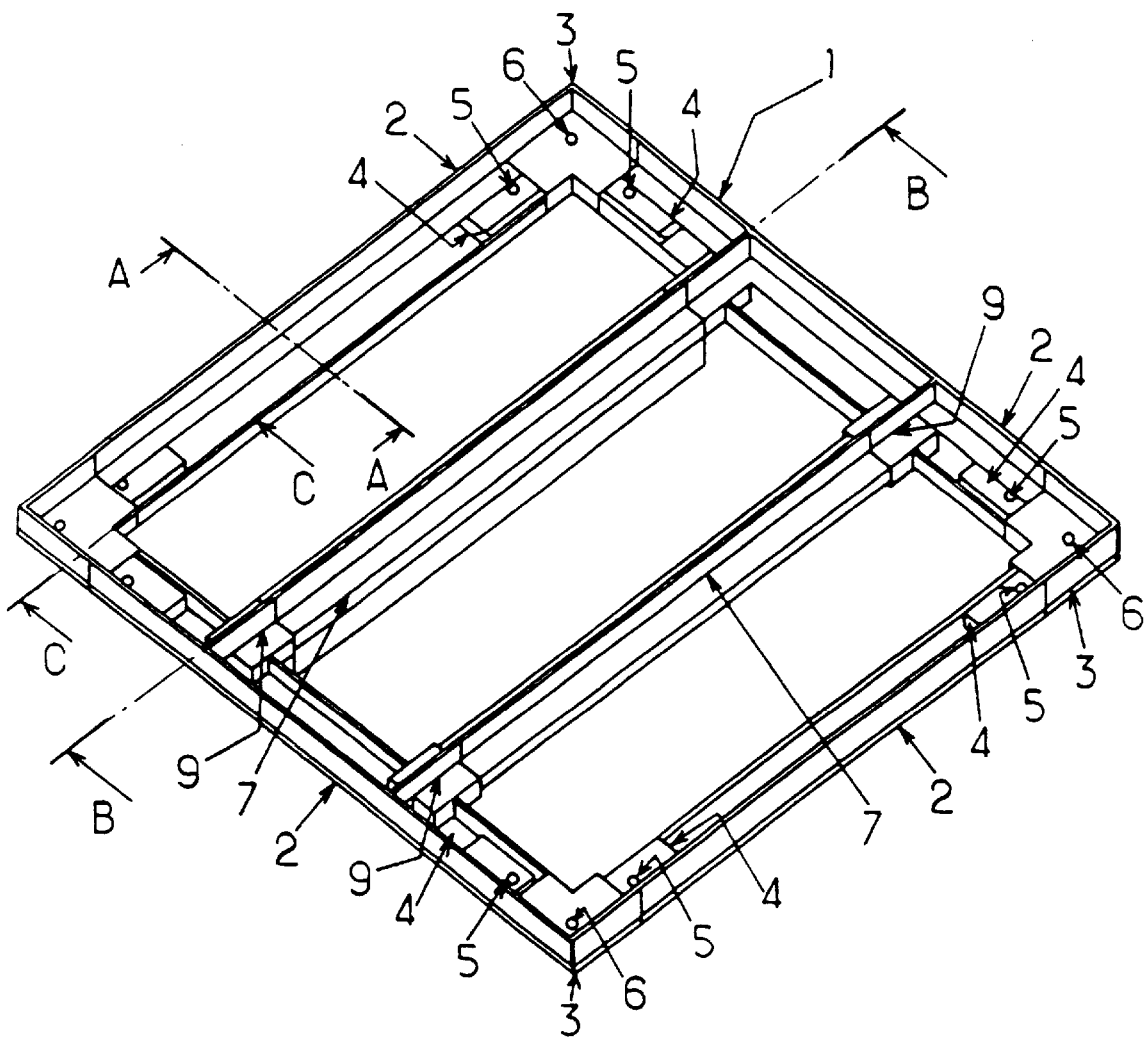
FIG. 7 is a perspective view of the frame as a whole.

The floor panel in accordance with the invention comprises a frame 1 made up of metal section pieces 2 of appropriate lengths, the geometry of which may correspond either to that of the other solid floor panels or to that of a floor panel cut along its diagonal. The generic term metal section piece does not in any way prejudge the way in which it is obtained, by rolling, assembly, extrusion, machining, casting, etc. The floor panel also comprises corner pieces 3 into which the metal pieces fit via sliding fishplates 4 with a locking device 5 (bolt, screw or rivet). A second device 6 inside the corner piece will allow fine adjustment of the height of the frame to bring it strictly even with the surrounding floor panels of the false flooring. For example, this device may consist of a screw placed inside a tapped hole made in the piece 3 or of an insert, this screw bearing against the head of the jack supporting the adjacent false flooring.

The combined length of the section pieces 2 and of the corner pieces 3 will correspond to the shortest horizontal dimension of the known floor panel, because differences can be taken up by sliding on the fishplates.

For this same reason, the height of the section piece frame and crossmembers of the floor panel will also correspond to the smallest thickness of false-flooring floor panel, any differences in height being taken up by the adjustment device 6 at each corner of the frame resting on the false-flooring support jacks.

It should be pointed out that the floor panel of the invention is designed to form an integral constituent part of a self-stabilized and rigid assembly, namely the false flooring in which it is placed, and which will hold it in place and maintain its geometry.

These principles allow this floor panel to be adapted to suit any geometric shape, including triangular, and dimensions of false-flooring floor panels used by users.

One or more metal crossmembers 7 are intended to delimit spaces within the frame. These crossmembers will consist of lengths of metal section piece which may or may not be the same form of section as that used for the frame 2 intended to support the functional filler pieces 12.

At each end, a head 9 can slide in the metal section piece 7 which rests on the section piece of the frame 1.

A locking device allows the overall length of the crossmember 7 and the head 9 to be adjusted to suit the size of the frame 1.

The locking device 11 consists of a screw placed inside a tapped hole made in the piece 9, or of a rivet or a bolt which secures the piece 9 to the piece 2 by a through-hole or by locking against the piece 2 or by being bolted directly to the flange of the section piece of the frame 1.

The shape of the heads of the crossmembers allows these to be maneuvered from above without removing or carrying out operations on the frame, so that the internal geometry of the solid bits and gaps can be altered on demand with no difficulty.

The floor panel can therefore be mounted easily on site underneath existing machines.

A certain number of movable functional elements 12 which may have square, rectangular or other shapes, fill in those parts which will not be reserved for the passage of services.

These elements will fit between the frame and the crossmembers or between the crossmembers on which they rest.

Having a thickness appropriate to their dimensions and construction, they may, if appropriate, have a shoulder 13 to allow them to get around the shape of the section pieces either of the frame or of the crosspieces.

This movable element may have various types of construction depending on the requirements and/or industrial possibilities:

a construction identical to a false-flooring floor panel (particleboard+bonded floor covering with or without metal underside;

solid functional elements which may or may not have a covering identical to the rest of the false flooring;

functional elements which are composed of lengths of metal section piece of appropriate width and the length of which will be cut to suit.

Any other construction or method that meets the technical requirements of the application is conceivable.

Each element that makes up the floor panel may thus be supplied separately, and may be fitted with a device intended to lock the assembly to the adjacent elements.

The floor panel can also, under the same technical conditions, support other functional elements which may or may not be built into the frame.

These functional elements may, without this list being exhaustive, be:

ventilation/air conditioning grids which may range from the smallest area up to the complete aperture of the area defined by the frame, thus allowing fine adjustment of flow rate and direction of air under and around the machines (corner blowing grids;

transparent elements intended to allow the cavity beneath the false floor to be seen, and which may be an integral part or may be small functional elements, and because of the flexibility with which they can be fitted inside the frame, be placed exactly above the device to be seen (detector, connection, meter, etc.);

heavy and/or light duty current sockets which may also be stand-alone elements or be integrated into functional elements of appropriate dimensions, while complying with their technical requirements;

boxes for coupling data-transmission cables;

any other special equipment items such as fluid or gas tappings (for laboratories, hospitals) which can be integrated into the system in the same way as is described above; and triangular false flooring floor panels resting on just three jacks.

Each of the functional elements may be supplied separately and may be provided with a device intended for mechanically locking the assembly to the adjacent elements.

By installing floor panels in accordance with the invention at the appropriate points, the following facilities become available:

openings of varying dimensions, including at the corners, for running cables, without mechanical weakening;

openings with the same variable dimensions for fitting air-conditioning grids which can be placed exactly where they are needed;

the construction of blowing ducts in small elements which allows fine adjustment of flow rates without the need to resort to flaps whose settings change and become soiled;

the possibility of fitting removable current outlets, connectors, etc.) and all fluid outlets.

All these openings and positions for the accessories can be altered, shifted, eliminated, re-sealed instantly by replacing the element concerned with another.

All the subassemblies of the system can be reused indefinitely without losses, and in an unimpeded variety of combinations.

In small rooms, it becomes possible to place receivers on the false floor with even more flexibility of layout, while retaining access to the cavity under the false floor.

The manufacture, storage, transport and fitting become simple and economical.

The floor panels may have just one type of standardized metal section piece which is common to the frame and to the crossmembers, supplemented by universally designed accessories: the functional corners and the crossmembers' support heads.

In its basic design, which at minimum meets its primary function which is to allow fluids to be run between the upper and lower surfaces of the false flooring, the floor panel will consist of:

functional corners;

section pieces forming the frame;

an appropriate number of crossmembers with their support heads; and an appropriate number of functional elements.

Mounting can be done easily on site with the barest minimum amount of tooling.

It is very easy to alter the construction and location of the functional elements within the frame. Whereas in general it is difficult to lift a false-flooring floor panel unless the appropriate suction device (or hook in the case of a carpeted covering) is to hand, the elements of the system are easily removed.

When all the functional elements are solid and fill the area of the frame, at least one of them may have a hole to allow it to be gripped with ease and will act as a "key" for removing the others.

What is more, it will also be very easy to alter the internal geometry of the system, the crossmembers being shifted by sliding them along the frame or by removing them and refitting them from above without intervention on the frame.

The floor panels of the invention therefore become a preferred access point requiring no special tools to reach the cavity under the false floor.

The triangular false-flooring floor panels reduce the time spent adjusting the jacks when laying it.

In the embodiment of FIG. 8, the frame is square and is made up of section pieces made of steel sheet comprising the side pieces 14 connected in pairs by functional corners 19 resting on jacks, it being possible for this frame also to include a certain number of removable crossmembers such as 15 of different lengths, for example subdivisions of the length of the sides 14. Thus the crossmember 15 may connect two opposed sides 14 ⅓ of the way along their length and itself be connected transversely, at thirds of its length, to the other two opposed sides 14 by two more crossmembers, one being ⅓ of the length of a side, the other ⅔. The connection may be by vertical tabs 16 on the ends of the crossmembers, the tabs being engaged in slots 17 in the sides or in slots 18 of another crossmember, depending on the modular configuration adopted. A modular floor panel can thus be divided into a maximum of nine square subpanels of equal area. It is thus possible to obtain a fully-equipped modular floor panel comprising for example a floor box, an inspection port, a connection box, and a ventilation grid, the areas of these elements being multiples of ⅑th of the total area of the floor panel.

The functional corners 19 (see FIG. 9) are fitted with a device for the heightwise adjustment of the frame C relative to the corresponding support plate 20 borne by the corner jack, it being possible for the frame C and this plate to move vertically one relative to the other with guidance by sliding of vertical perforated flanges 21 and 22 of the frame C against perforated flanges 23 and 24 respectively of the plate 20. The flanges 21 and 22 each have a horizontal row 25, 26 of six perforations and three horizontal rows of six perforations each, referenced 27 and 28 respectively (the top row of the rows 28 is hidden by the rim of the frame).

Correspondingly, the flanges 23 and 24 of the plate 20 each have three inclined rows of six perforations each (29 for the flange 24; not visible in the case of the flange 23) and an inclined row of six perforations (30 for the flange 23; hidden by the rim of the plate 20 for the flange 24), the arrangement being such that for a given relative height of plate 20 relative to the frame C there is:

a perforation of the horizontal row 26 of the flange 22 coinciding with a perforation of the corresponding column of the inclined rows 29 of the flange 24;

a perforation of the not-visible inclined row of the flange 24 coinciding with a perforation of the corresponding column of the horizontal rows 28 of the flange 22;

a perforation of the inclined row 30 of the flange 23 coinciding with a perforation of the corresponding column of the horizontal rows 27 of the flange 21; and a perforation of the horizontal row 25 of the flange 21 coinciding with a perforation of the corresponding column of the inclined rows, not visible, of the flange 23, these eight perforations which coincide in pairs having a pin, a rivet or a screw passing through them.

This then yields a fairly large amount of freedom for relative heightwise adjustment of the corner plates 20 relative to the actual frame C, the maximum amplitude of this adjustment being equal to the difference in height between the lowest perforation of the bottom row of three inclined rows and the uppermost perforation of the top row of these three rows.

Of course, the combinations of horizontal rows/inclined rows, single rows/multiple rows described with reference to FIG. 9 are given merely by way of example, many alternatives being envisageable.

We claim:

1. A cavity area floor panel with removable functional elements for areas of false flooring, intended to form a constituent part of a self-stabilized and rigid assembly, comprising:

a frame (1) comprising metal section pieces (2) fitting into corner pieces (3) by means of fish plates (4) slidably interconnecting adjacent corner pieces and section pieces;

the total length of section pieces (2) and the corner pieces (3) corresponding to a predetermined horizontal dimension of adjacent floor panels of the false flooring, so that the sliding fish plates are operative to selectively adjust the horizontal dimension of the floor panel to differences in horizontal dimensions of an adjacent floor panel; and at least one metal crossmember (7) extending between selected section pieces to delimit space within the frame, and having a thickness corresponding to a predetemiined smallest thickness of the surrounding floor panels of the false flooring, so that any differences in height are taken up by adjusting the elevation of each corner piece.

2. Floor panel according to claim 1, characterized in that the edges of the floor panel are trapezoidal, to allow the floor panel to be fitted alongside adjacent floor panels and removed easily.

3. Floor panel according to claim 1, further comprising:

a device (5) operative for locking the sliding fish plates (4) to the corner pieces (3); and a corner piece device (6) operatively associated with each corner piece (4) to allow fine adjustment of the height of the frame (1) to bring the frame even with surrounding floor panels of the false flooring.

4. Floor panel according to claim 1, wherein each crossmember (7) has at each end a sliding head (9) that rests on the section piece (2) of the frame, and further comprising:

a locking device (11) associated with each locking head and crossmember to allow the overall length of the crossmember (7) and the head (9) to be adjusted to the size of the frame (1).

5. Floor panel according to claim 1, further having movable functional elements (12) which fit between the frame (1) and the crossmembers (7), on which the movable functional elements rest.

6. Floor panel according to claim 1, further comprising:

a device for adjusting the height of the frame (1) relative to a support plate (20), the device including a vertical perforated flange (21; 22) of the frame sliding against a vertical perforated flange (23; 24) of the plate (20);

the perforations in one of the flanges (23; 24) being arranged in at least one superimposed parallel row (30; 29) are inclined relative to at least one row of perforations (27; 26) in the other flange (21; 22), so that the height of the frame (1) relative to the support plate (20) is adjustable by vertically moving one relative to the other and then locking together a perforation of the flange of the frame (21; 22) and a coinciding perforation of the flange (23; 24) of the support.

* * * * *